Figure 1:
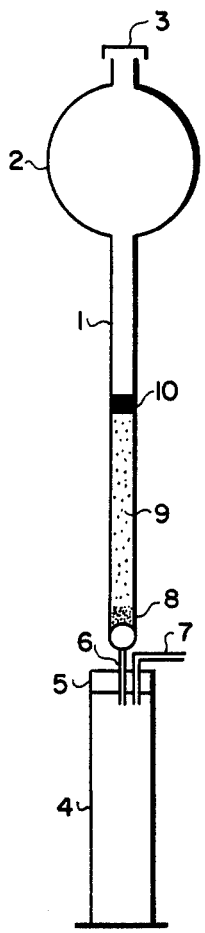

United States Patent [19]

Dominiani, Jr. et al.

[11] Patent Number: 4,551,320

[45] Date of Patent: Nov. 5, 1985

[54] TREATMENT OF CONCENTRATED PHOSPHORIC ACID

[75] Inventors: Frank J. Dominiani, Jr., Flemington, N.J.; Dennis C. Annarelli, Newtown, Pa.

[73] Assignee: FMC Corporation, Philadelphia, Pa.

[21] Appl. No.: 660,341

[22] Filed: Oct. 12, 1984

[51] Int. Cl.$^4$ .............................................. C01B 25/16
[52] U.S. Cl. ................................... 423/321 R; 423/316
[58] Field of Search ................. 423/319, 320, 321 R, 423/321 S, 167, 316

[56] References Cited

U.S. PATENT DOCUMENTS

| | | | |
|---|---|---|---|
| 3,297,401 | 1/1967 | Sakamura et al. | 23/165 |
| 3,306,702 | 2/1967 | Odland et al. | 23/165 |
| 3,374,055 | 3/1968 | Villalon | 423/320 |
| 3,492,092 | 1/1970 | Higgin | 423/320 |
| 3,645,682 | 2/1972 | Cochran | 23/165 |
| 3,764,657 | 10/1973 | Frankenfeld et al. | 423/321 |
| 3,993,735 | 11/1976 | Irani | 423/321 R |
| 3,993,736 | 11/1976 | Irani | 423/321 S |
| 4,242,198 | 12/1980 | Hill | 423/321 R |
| 4,363,880 | 12/1982 | Whitney et al. | 521/26 |

FOREIGN PATENT DOCUMENTS

| | | | |
|---|---|---|---|
| 512996 | 5/1976 | U.S.S.R. | 423/321 S |
| 528260 | 9/1976 | U.S.S.R. | 423/321 R |

Primary Examiner—Gregory A. Heller
Attorney, Agent, or Firm—George F. Mueller; Frank Ianno

[57] ABSTRACT

The calcium content of high purity concentrated phosphoric acid is reduced to not more than about 2 ppm by contacting the acid with a strong cation exchange resin.

6 Claims, 1 Drawing Figure

APPARATUS FOR ELUTING 85% $H_3PO_4$ THROUGH ION EXCHANGE RESIN

TREATMENT OF CONCENTRATED PHOSPHORIC ACID

This invention relates to the treatment of phosphoric acid and more specifically to the treatment of concentrated phosphoric acid.

Phosphoric acid suitable for use by the semiconductor industry must be of high purity. Increasingly stringent specifications of the semiconductor industry are continuously being established because of the efforts expended in miniaturization of the components. The calcium content of the phosphoric acid is one of the critical impurities permissible in the acid and presently 85% phosphoric acid containing up to 5 ppm calcium is acceptable by the industry. As miniaturization proceeds, the industry specifications will reduce the acceptable calcium level.

The present invention provides a means for reducing selectively and substantially the calcium content of relatively high purity 85% phosphoric acid; that is, phosphoric acid containing about 61% $P_2O_5$ and having a specific gravity of about 1.68.

A convenient source of a commercial grade of phosphoric acid of relatively high purity is food grade 85% phosphoric acid. The specifications for this grade of phosphoric acid do not include a limit for the calcium content which may vary up to about 0.02%.

It has been found that the calcium content of the concentrated phosphoric acid may be reduced substantially by contacting the acid with a strong cation exchange material or resin in its acid form.

It is well recognized that in order to effect the purification of acids by the use of ion exchange substances, it is essential that the acid must be dissociated or ionized. It is also well recognized that 85% phosphoric acid is essentially undissociated. Therefore, one would not expect the cationic exchange resin to be effective in lowering the calcium level of the undissociated acid. The substantial reduction in calcium content by contacting the concentrated phosphoric acid with a cation exchange substance in its acid form is unexpected. Other impurities such as sodium and potassium are substantially unaffected.

Satisfactory apparatus for demonstrating the efficacy of the present method is illustrated in the drawing. A 50 ml buret 1 is provided with a reservoir consisting of a 1 liter round bottom flask 2 which may be fitted with a cover 3 to avoid the entry of foreign particles. A 50 ml graduate 4 is used to collect aliquots of treated acid. The graduate is fitted with a rubber stopper 5 through which the discharge end 6 of the buret 1 extends into the graduate. Because of the high viscosity of the concentrated phosphoric acid, a tube 7 is threaded through the stopper and is connected to a vacuum pump (not shown) so as to reduce the period required for the acid to flow through the ion exchanger.

In order to illustrate the effect of the present invention, the following representative examples are set forth. In each of the examples, a small wad of glass wool 8 was inserted in the graduate. A commercial cationic ion exchange resin 9, Dowex ® 50W-X8,H+, 25-50 mesh, was added to the graduate in an amount of 25 ml. It was necessary to cover the resin bed with a sand plug 10 (about 1 ml in depth) so as to maintain the resin in position because its density is lower than that of the concentrated phosphoric acid. Before adding the sand, it was washed with dilute hydrochloric acid. After adding the acid washed sand, deionized water was passed through the column until the exiting water had a pH of 5.3. The water was then drained from the column to the level of the sand plug. In each of the examples, the initial 50 ml aliquot of the liquid leaving the column was discarded. Because of the dehydrating action of the acid, the volume of the resin was reduced by about 30%. The vacuum was varied during the runs from about 450 mm Hg at the start of the runs to about 380 mm Hg near the end of the runs so as to provide a 50 ml aliquot in about 30 seconds.

EXAMPLE 1

A 2 liter sample of a food grade 85% phosphoric acid relatively high in calcium and sodium content was obtained. The acid was added in 1 liter increments to the flask and the stopcock of the buret opened to allow the acid to flow through the column. The second 50 ml aliquot was collected in 32.4 minutes without vacuum. A vacuum of 635 mm Hg was applied to the vacuum tube 7 for the 7th aliquot which was collected in 1.4 minutes. The pump was then adjusted to provide a vacuum of 450 mm Hg and maintained at this pressure for collection of the 8th through the 29th aliquots. The time required for collection of these aliquots was about 0.5 minutes each. The pump was again adjusted to provide a vacuum of 380 mm Hg for the collection of the remaining aliquots.

The calcium and sodium content of the initial acid and the 4th and 40th aliquots is reported in Table I. It will be noted that the method reduces substantially the calcium content. It is recognized that as the resin removes calcium and becomes loaded, the removal of calcium decreases and the time for the collection of the aliquots increases. The experiment was continued beyond a calcium reduction to not more than about 2 ppm to determine the maximum amount of acid which could be treated and yet result in a substantial reduction of the calcium.

EXAMPLE 2

Another 2 liter sample of a food grade 85% phosphoric acid relatively low in calcium and sodium content was obtained. The procedure as described in Example 1 was followed in the treatment of this sample of acid.

The calcium and sodium content of the initial acid and the 4th and 40th aliquots is reported in Table II. As in Example 1, as calcium is removed by the resin and the resin becomes loaded, the removal of calcium decreases. The experiment was continued beyond a calcium reduction to not more than one-half that of the original calcium content to determine the maximum amount of acid which could be treated and yet result in a substantial reduction of the calcium.

As apparent from the Examples, the calcium content of the acid may be reduced to not more than about 2 ppm. Obviously, the greater the calcium content of the concentrated phosphoric acid to be treated, the greater the reduction in the calcium content effected by the treatment. Where the calcium content of the acid is low (3.3 ppm), the method results in a 67% reduction of calcium. Where the calcium content is high (11 ppm), the method results in at least an 80% reduction of calcium.

For the purposes of the present invention, any of the commercially available strong cation exchange resins in their acid form are satisfactory. These resins are of the sulphonic acid type. Where the resin is in the sodium form, it is converted into the acid form by washing with a hydrochloric acid solution. In addition to the resin utilized in the Examples, other satisfactory commercial resins are Dowex HGR-W2 (Dow Chemical Company, Midland, Mich.), Amberlite CG-120 and Amberlite CGC-241 (Rohm and Haas Company, Philadelphia, Pa.). It is obvious that following use of the resin it may be regenerated by washing with a hydrochloric acid solution.

TABLE I

| Aliquot | Ca (ppm) | Na (ppm) |
|---|---|---|
| Acid as received | 11.0 | 400 |
| No. 4 | 1.9 | 360 |
| No. 40 | 7.9 | 480 |

TABLE II

| Aliquot | Ca (ppm) | Na (ppm) |
|---|---|---|
| Acid as received | 3.3 | 1.6 |
| No. 4 | 1.1 | 1.4 |
| No. 40 | 1.7 | 1.6 |

What is claimed is:

1. The method of selectively and substantially reducing the calcium content without affecting substantially the sodium and potassium content of high purity concentrated phosphoric acid which comprises contacting a high purity, undissociated 85% phosphoric acid including calcium, sodium and potassium containing impurities with a strong cation exchange resin and its acid form and recovering 85% phosphoric acid having a reduced calcium content and substantially the same sodium and potassium content as the high purity 85% phosphoric acid being treated.

2. The method as defined in claim 1 wherein the high purity 85% phosphoric acid being treated is passed through a bed of the strong cation exchange resin.

3. The method as defined in claim 1 wherein the high purity 85% phosphoric acid being treated is food grade 85% phosphoric acid.

4. The method as defined in claim 3 wherein the food grade 85% phosphoric acid being treated contains at least about 3 ppm calcium and the recovered 85% phosphoric acid contains not more than about 2 ppm calcium.

5. The method as defined in claim 4 wherein the food grade 85% phosphoric acid being treated contains from about 3 to about 20 ppm calcium.

6. The method as defined in claim 4 wherein the food grade 85% phosphoric acid being treated contains about 11 ppm calcium.

* * * * *